United States Patent
Wu

(10) Patent No.: US 9,261,422 B2
(45) Date of Patent: Feb. 16, 2016

(54) MULTI-COMPONENT FORCE AND MOMENT SENSOR

(71) Applicant: HON HAI PRECISION INDUSTRY CO., LTD., New Taipei (TW)

(72) Inventor: Li-Wei Wu, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 0 days.

(21) Appl. No.: 14/600,633

(22) Filed: Jan. 20, 2015

(65) Prior Publication Data
US 2015/0260591 A1 Sep. 17, 2015

(30) Foreign Application Priority Data
Mar. 11, 2014 (TW) .............................. 103108339 A

(51) Int. Cl.
*G01L 5/16* (2006.01)
*G01L 1/22* (2006.01)

(52) U.S. Cl.
CPC .. *G01L 5/161* (2013.01); *G01L 1/22* (2013.01)

(58) Field of Classification Search
CPC ...................................................... G01L 5/161
USPC ..................................................... 73/862.045
See application file for complete search history.

(56) References Cited

U.S. PATENT DOCUMENTS 5,648,617 A * 7/1997 Cullen et al. ............. 73/862.045
2013/0239701 A1* 9/2013 Huang ..................... 73/862.045

* cited by examiner

*Primary Examiner* — Lisa Caputo
*Assistant Examiner* — Octavia Hollington
(74) *Attorney, Agent, or Firm* — Novak Druce Connolly Bove + Quigg LLP

(57) ABSTRACT

A multi-component force and moment sensor includes a mounting assembly and a conducting assembly. The mounting assembly includes an upper cover and a lower cover coupled to the upper cover. The upper cover defines four concave portions. The lower cover defines four concave portions. The conducting assembly includes a cross beam and a plurality of sensors. The cross beam is positioned between the upper cover and the lower cover. The cross beam has four arms. Each arm is received in each concave portion of the upper cover and each concave portion of the lower cover. Each arm has four sidewalls. Each sidewall is inclined to a reference plane. Each sensor is attached to one of the sidewalls of each arm.

19 Claims, 4 Drawing Sheets

MULTI-COMPONENT FORCE AND MOMENT SENSOR

FIELD

The subject matter herein generally relates to force and moment sensors, and particularly to a multi-component force and moment sensor.

BACKGROUND

A multi-component force and moment sensor can be used in a robot. When the robot works, the multi-component force and moment sensor senses a force and moment of an actuator of the robot for calculating an error of the actuator.

BRIEF DESCRIPTION OF THE DRAWINGS

Implementations of the present technology will now be described, by way of example only, with reference to the attached figures.

DETAILED DESCRIPTION

Figure 1:
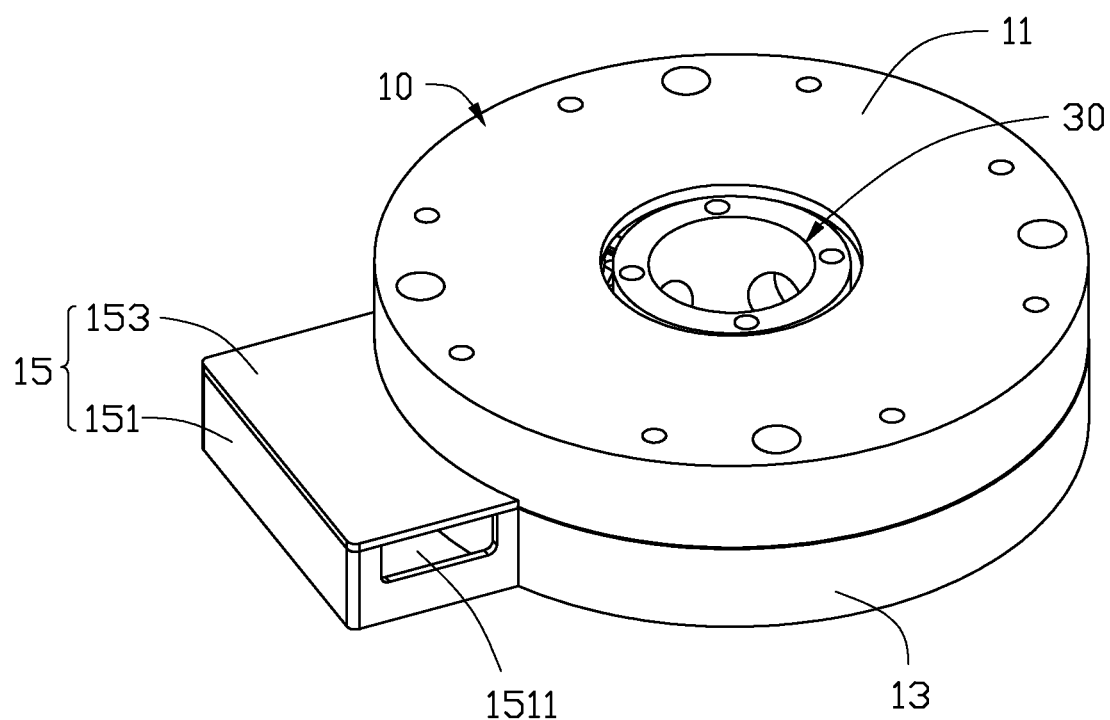
FIG. 1 is an isometric view of an embodiment of a multi-component force and moment sensor.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is in relation to a multi-component force and moment sensor which can include a mounting assembly and a conducting assembly. The mounting assembly can include an upper cover and a lower cover coupled to the upper cover. The upper cover can have a bottom surface. The bottom surface can define an inner chamber. The upper cover can include four V-shaped concave portions communicating with the inner chamber. The lower cover can be coupled to the upper cover and have an upper surface. The upper surface can define an inner chamber. The lower cover can include four V-shaped concave portions communicating with the inner chamber of the upper surface. The conducting assembly can include a cross beam and a plurality of sensors. The cross beam can be received in the inner chamber of the upper cover and the inner chamber of the lower cover. The cross beam can have four arms. Each arm can be received in a V-shaped concave portion of the bottom surface and the upper surface. Each arm can have four sidewalls. Each sidewall can be non-perpendicular to an imaginary reference plane formed by the axes of the arms. Each sensor can be attached to one of the sidewalls of each arm.

The present disclosure is in relation to a multi-component force and moment sensor which can include a mounting assembly and a conducting assembly. The mounting assembly can include an upper cover and a lower cover coupled to the upper cover. The upper cover can include four concave portions. The lower cover can include four concave portions. The conducting assembly can include a cross beam and a plurality of sensors. The cross beam can be positioned between the upper cover and the lower cover. The cross beam can have four arms. Each arm can be received in a concave portion of the upper cover and the lower cover. Each arm can have four sidewalls. Each sidewall can be inclined to an imaginary reference plane formed by the axes of the arms. Each sensor can be attached to one of the sidewalls of each arm.

FIG. 1 illustrates an embodiment of a multi-component force and moment sensor 100 configured to be used in a robot arm and sense a force and moment of an actuator of the robot arm in work. When the robot is in assembly or in machining, the multi-component force and moment sensor 100 can be configured to sense a force and moment of the actuator of the robot arm. The multi-component force and moment sensor 100 can include a mounting assembly 10 and a conducting assembly 30 received in the mounting assembly 10.

The mounting assembly 10 can include an upper cover 11, a lower cover 13, and a receiving member 15. The upper cover 11 and the lower cover 13 can be in similar structures and coupled together. The receiving member 15 can be coupled to a periphery of the lower cover 13.

Figure 2:
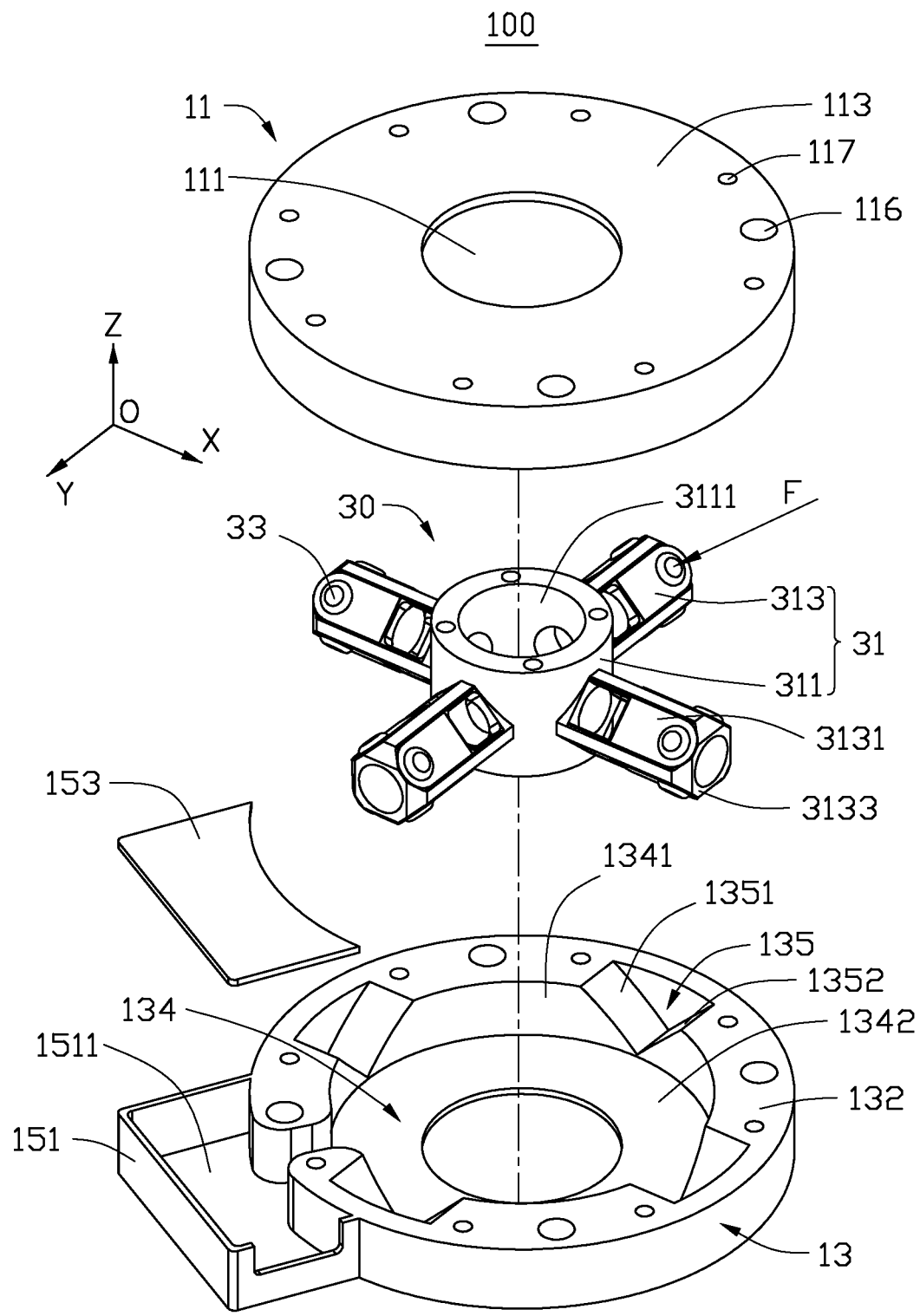
FIG. 2 is an exploded, isometric view of the multi-component force and moment sensor of FIG. 1.

FIG. 2 illustrates that the upper cover 11 can be substantially disc-shaped. The upper cover 11 can define a through hole 111 along a center axis thereof. The upper cover 11 can include a bottom surface 112 (shown in FIG. 3) and a top surface 113 substantially parallel to the bottom surface 112. The top surface 113 can define four mounting holes 116 and eight fixing holes 117 along a direction parallel to the center axis of the upper cover 11. The mounting holes 116 and the fixing holes 117 can be positioned adjacent to an edge of the top surface 113 and positioned around an imaginary circle. Each mounting hole 116 can be positioned between two fixing holes 117.

Figure 3:
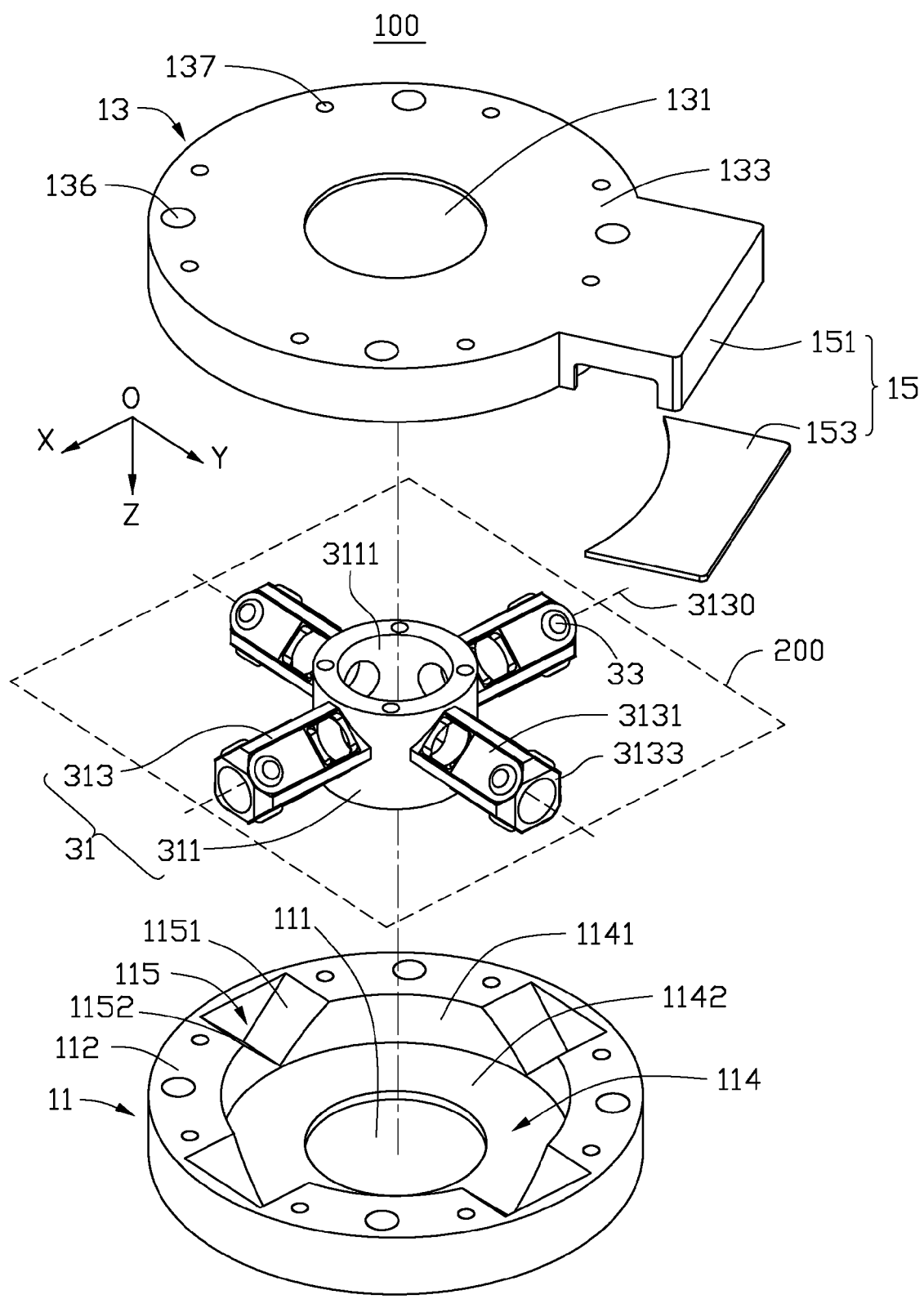
FIG. 3 is similar to FIG. 2, but viewed from another angle.

FIG. 3 illustrates that an inner chamber 114 can be depressed from the bottom surface 112 to define an inner circular surface 1141 and an end surface 1142. The inner circular surface 1141 and the end surface 1142 can define the inner chamber 114, cooperatively. The inner chamber 114 can be substantially coaxial with the through hole 111. The upper cover 11 can have four concave portions 115 positioned at the bottom surface 112 and evenly spaced from each other. The concave portions 115 can be substantially V-shaped. The concave portions 115 can be in fluid communication with the inner chamber 114. A first surface 1151 and a second surface 1152 can be received in a concave portion 115. The second surface 1152 can be coupled to the first surface 1151 and substantially perpendicular to the first surface 1151. The second surface 1152 and the first surface 1151 can define a V shape, cooperatively. Each of the first surface 1151 and the second surface 11152 can be coupled to the bottom surface 112. Each mounting hole 116 and the two adjacent fixing holes 117 can be positioned between two of the concave portions 115.

The lower cover 13 can be in a similar structure with the upper cover 11. The lower cover 13 can also define a through hole 131 along a center axis thereof. The upper cover 11 can include an upper surface 132 (shown in FIG. 2) and a lower surface 133 (shown in FIG. 3) substantially parallel to the upper surface 132. An inner chamber 134 can be depressed from the upper surface 132 to define an inner circular surface 1341 and an end surface 1342. The inner circular surface 1341 and the end surface 1342 can define the inner chamber 134, cooperatively. The inner chamber 134 can be substantially coaxial with the through hole 131.

The lower cover 13 can have four concave portions 135 positioned at the upper surface 132 and evenly spaced from each other. The concave portions 135 can be substantially V-shaped. The concave portions 135 can be in fluid communication with the inner chamber 134. A first surface 1351 and a second surface 1352 can be received in a concave portion 135. The second surface 1352 can be coupled to the first surface 1351 and substantially perpendicular to the first surface 1351. The second surface 1352 and the first surface 1351 can define a V shape, cooperatively. Each of the first surface 1351 and the second surface 13152 can be coupled to the upper surface 132.

The lower surface 133 can define four mounting holes 136 and eight fixing holes 137 along a direction parallel to the center axis of the upper cover 13. The mounting holes 136 and the fixing holes 137 can be positioned adjacent to an edge of the lower surface 133 and positioned around an imaginary circle. Each mounting hole 136 can be positioned between two fixing holes 137. Each mounting hole 136 and the two adjacent fixing holes 137 can be positioned between two of the concave portions 135.

The upper surface 132 of the lower cover 13 can contact and resist the bottom surface 112 of the upper cover 11. The upper lover 11 can be stacked on the upper surface 132 of the lower cover 13. The mounting holes 136 of the lower cover 13 can be aligned with the mounting holes 116 of the upper cover 11, respectively. The fixing holes 137 of the lower cover 13 can be aligned with the fixing holes 117 of the upper cover 11, respectively. The concave portions 135 of the lower cover 13 can be aligned with the concave portions 115 of the upper cover 11, respectively.

The receiving member 15 can be fixedly coupled to an outer surface of the lower cover 13. The receiving member 15 can include a receiving portion 151 and a cover 153 coupled to the receiving portion 151. The receiving portion 151 can define a receiving room 1511. The receiving room 1511 can be configured to accept printed circuit boards electrically coupled to a controller of the robot or other elements. The cover 153 can cover the receiving room 1511.

The conducting assembly 30 can include a cross beam 31 and a plurality of sensors 33 attached to the cross beam 31. The cross beam 31 can include a main body 311 and four arms 313 coupled to the main body 311. The arms 313 can be evenly spaced from each other and define a cross shape. The sensors 33 can be attached to each arm 313 and positioned at a first end portion of each arm 313 away from the main body 311. The main body 311 and a second end portion of each arm 313 adjacent to the main body 311 can be received in the inner chamber 114 and inner chamber 134. The second end portion of each arm 313 can be opposite to the first end portion. The first end portion of each arm 313 can be received in one of the concave portions 115 and one of the concave portions 135. The side surfaces of each arm 313 can resist the first surface 1151, the first surface 1351, the second surface 1152, and the second surface 1352, respectively.

The main body 311 can be substantially hollow and cylindrical. The main body 311 can define a center hole 3111 along a center axis thereof. The center hole 3111 can be coaxial with through hole 111 and the through hole 131. The second end portion of each arm 313 can be fixedly coupled to an outer side surface of the main body 311. Each arm 313 can be substantially a hollow cuboid and include four sidewalls 3131 and an end wall 3133 coupled to the sidewalls 3131. The sidewalls 3131 can be coupled to each other in subsequence. Each two adjacent sidewalls 3131 can be substantially perpendicular to each other. Each sidewall 3131 can be inclined with a horizontal plane.

An included angle between each sidewall 3131 and the horizontal plane can be 45 degrees. Thus, each sidewall 3131 can be inclined with an imaginary reference plane 200 formed by the axes 3130 of the arms 313. The reference plane 200 can be parallel to the horizontal plane. An included angle between each sidewall 3131 and the reference plane 200 can be 45 degrees. The end wall 3133 can be substantially square shaped and substantially perpendicular to the sidewalls 3131. The first end portion of each arm 313 can be received in the corresponding concave portion 115 and the corresponding concave portion 135.

Each sensor 33 can be attached to each sidewall 3131 of each arm 313. The four sensors 33 attached to the four sidewalls 3131 of each arm 313 can resist the first surface 1151, the second surface 1152, the first surface 1351, and the second surface 1352, respectively. In the illustrated embodiment, a number of the sensors 33 can be sixteen. The sensors 33 can be FlexiForce sensor of Tekscan. In at least one embodiment, the sensors 33 can be sensors of other type.

Figure 4:
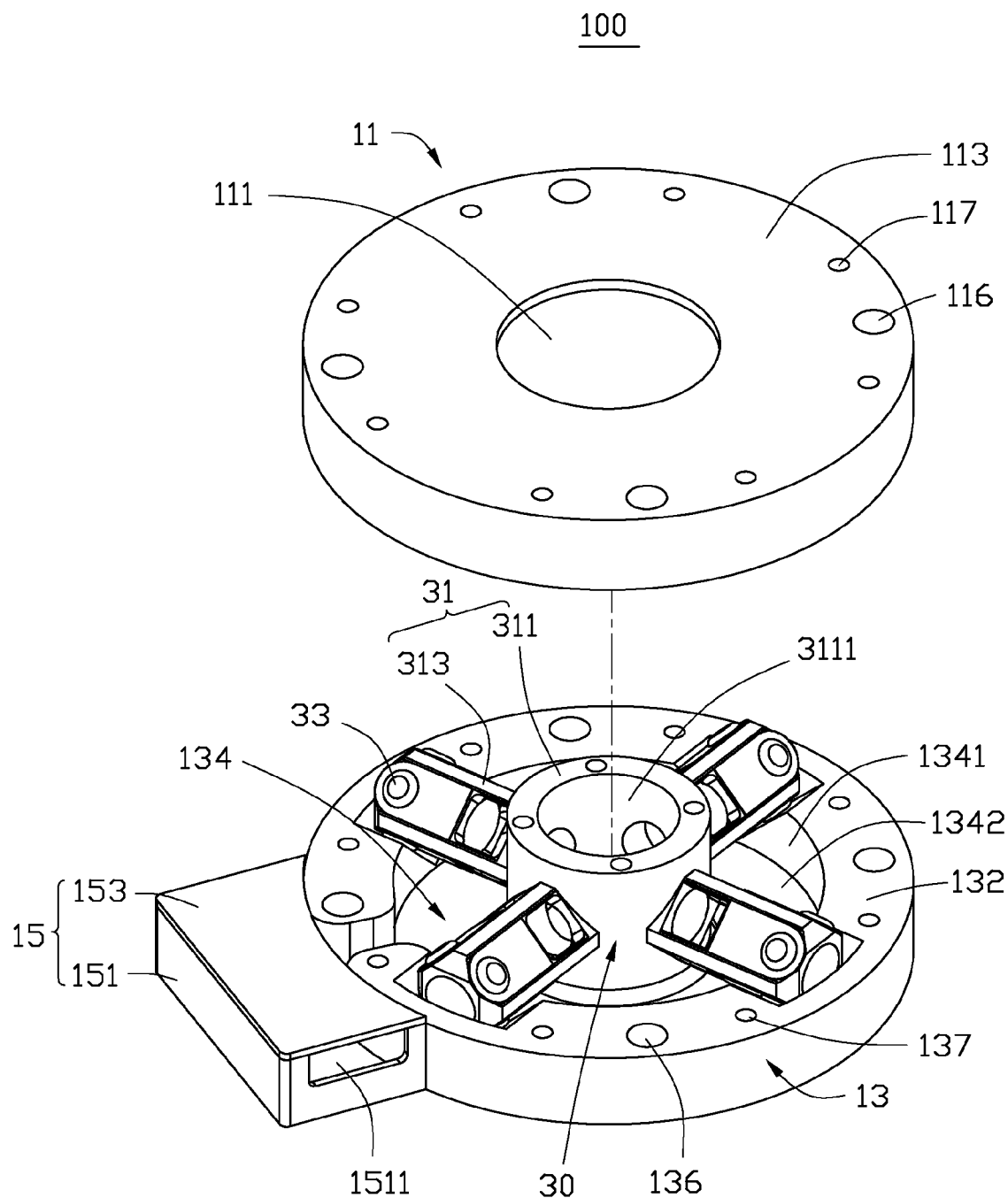
FIG. 4 is a partially exploded, isometric view of the multi-component force and moment sensor of FIG. 1.

FIG. 4 illustrates when in assembly, the receiving member 15 can be coupled to the outer surface of the lower cover 13. The sensors 33 can be attached to each sidewall 3131 of each arm 313. The cross beam 31 can be placed into the inner chamber 134 of the lower cover 13. The center hole 3111 can be aligned with the through hole 131. Each arm 313 can be partly received in the concave portions 135. Two of sensors 33 attached to each arm 313 can resist the first surface 1351 and the second surface 1352 of the corresponding concave portion 135. The upper cover 11 can be stacked on the lower cover 13. The first end portion of each arm 313 can be received in the corresponding concave portion 115. The through hole 111 can be aligned with the center hole 3111. The two sensors 33 respectively attached to another two sidewalls 3131 can resist the first surface 1151 and the second surface 1152 of the corresponding concave portion 115. The upper cover 11 can be fixed to the lower cover 13. Fastens can be inserted into the fixing holes 117 and the fixing holes 137 to secure the upper cover 11 and the lower cover 13.

When in use, screws can be inserted into the mounting holes 116 and the mounting holes 136 to fix the multi-component force and moment sensor 100 to a robot arm. The multi-component force and moment sensor 100 can be sleeved on a fixture coupled to an actuator of the robot arm. The sensors 33 can be electrically coupled to a controller of the robot arm. The fixture can be forced when in use and a force can be conducted to the cross beam 31 of the multi-component force and moment sensor 100. Thus, the cross beam 31 can have a tendency of motion relative to the mounting assembly 10. Because the cross beam 31 is positioned between the upper cover 11 and the lower cover 13, the upper cover 11 and the lower cover 13 can block the cross beam 31 to stop a movement of the cross beam 31. Thus, the lower cover 13 and the upper cover 11 can resist the sensors 33 and apply a force to each sensor 33. The force applied to each sensor 33 can be perpendicular to the corresponding sidewall 3131. When the sensors 33 are pressed by the first surface 1151, the second surface 1152, the first surface 1351, and the second surface 1352, an electrical signal emitted by each sensor 33 can change and the electrical signal can be transmitted to the controller of the robot arm. In the illustrated embodiment, the sensor 33 can be a resistance strain sensor. The sensors 33 can be deformed when being pressed and a resistance can be changed. Thus, a voltage can be changed. The controller can calculate the force by a change of the voltage.

In detail, a coordinate system can be defined and have three coordinate axes (X-axis, Y-axis and Z-axis) intersecting with each other perpendicularly. A point of origin of the coordinate system can be positioned at a center of the cross beam 31. The X-axis and the Y-axis can be positioned along two adjacent arms 313. The Z-axis can be substantially perpendicular to the reference plane 200. The reference plane 200 can be parallel to an XY-plane. A force F can be applied to the sensor 33. The force F can be substantially perpendicular to the corresponding sidewall 3131. Thus, a component force Fy in a Y-direction can be $F*\cos 90°$. An included angle between the force F and the X-axis of an included angle between the force F and the Z-axis can be 45 degrees. Thus, a component force Fx in an X-direction can be $F*\cos 45°$. A component force Fz in a Z-direction can be $F*\cos 45°$. The controller can calculate each component force of each sensor 33 and total up component forces in each of the X-direction, the Y-direction, and the Z-direction of the sensors 33. The fixture can be adjusted controlled by the controller according to the forces applied to the sensors 33.

In at least one embodiment, the bottom surface 112 of the upper cover 11 and the upper surface 132 can be spaced apart in a predetermined distance. Each arm 313 can be solid. The included angle between each sidewall 3131 and the reference plane 200 can be not limited to 45 degrees. Each sidewall 3131 can be non-perpendicular to the reference plane 200. The first surface 1151 can be non-perpendicular to the second surface 1152. The first surface 1351 can be non-perpendicular to the second surface 1352.

The embodiments shown and described above are only examples. Many details are often found in the art such as the other features of a multi-component force and moment sensor. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A multi-component force and moment sensor comprising:
    a mounting assembly comprising:
        an upper cover having a bottom surface, the bottom surface defining an inner chamber, the upper cover comprising four V-shaped concave portions communicating with the inner chamber, and
        a lower cover coupled to the upper cover and having an upper surface, the upper surface defining an inner chamber, the lower cover including four V-shaped concave portions communicating with the inner chamber of the upper surface; and
    a conducting assembly comprising:
        a cross beam received in the inner chamber of the upper cover and the inner chamber of the lower cover, the cross beam having four arms, each arm received in a V-shaped concave portion of the bottom surface and the upper surface, each arm having four sidewalls, each sidewall non-perpendicular to an imaginary reference plane formed by axes of the arms, and
        a plurality of sensors, each of which being attached to one of the sidewalls of each arm.

2. The multi-component force and moment sensor of claim 1, wherein the inner chamber of the upper cover is depressed from the bottom surface to define an inner circular surface and an end surface, the inner chamber of the lower cover is depressed from the upper surface to define an inner circular surface and an end surface.

3. The multi-component force and moment sensor of claim 1, wherein a first surface and a second surface are received in each V-shaped concave portion of the upper cover or each V-shaped concave portion of the lower cover, each first surface or each second surface resist one of the plurality of sensors.

4. The multi-component force and moment sensor of claim 3, wherein the first surface is substantially perpendicular to the second surface.

5. The multi-component force and moment sensor of claim 1, wherein an included angle between each sidewall and the reference plane which the arms positioned therein is 45 degrees.

6. The multi-component force and moment sensor of claim 1, wherein the cross beam further comprises a main body, the arms are coupled to the main body and evenly spaced from each other.

7. The multi-component force and moment sensor of claim 6, wherein both the upper cover and the lower cover define a through hole, the main body defines a center hole, the center hole is aligned with the through hole of the upper cover and the through hole of the lower cover.

8. The multi-component force and moment sensor of claim 1, wherein the upper cover further has a top surface parallel to bottom surface, the lower cover further has a lower surface parallel to the upper surface, both the top surface and the lower surface define at least one mounting hole and at least one fixing hole, the at least one mounting hole of the upper cover is aligned with the at least one mounting hole of the lower cover, the at least one fixing hole of the upper cover is aligned with the at least one fixing hole of the lower cover.

9. The multi-component force and moment sensor of claim 1, wherein the mounting assembly further comprises a receiving member coupled to a periphery of the lower cover, the receiving member comprises a receiving portion and a cover coupled to the receiving portion, the receiving portion defines a receiving room, the cover covers the receiving room.

10. The multi-component force and moment sensor of claim 1, wherein each sensor is a resistance strain sensor.

11. A multi-component force and moment sensor comprising:

a mounting assembly comprising:
   an upper cover including four concave portions, and
   a lower cover coupled to the upper cover and comprising four concave portions; and
a conducting assembly comprising:
   a cross beam positioned between the upper cover and the lower cover, the cross beam having four arms, each arm received in a concave portion of the upper cover and the lower cover, each arm having four sidewalls, each sidewall inclined to an imaginary reference plane formed by axes of the arms, and
   a plurality of sensors, each of which being attached to one of the sidewalls of each arm.

12. The multi-component force and moment sensor of claim 11, wherein an inner chamber is depressed from a bottom surface of the upper cover, another inner chamber is depressed from an upper surface of the lower cover.

13. The multi-component force and moment sensor of claim 11, wherein a first surface and a second surface are received in each concave portion of the upper cover or each concave portion of the lower cover, each first surface or each second surface resist one of the plurality of sensors.

14. The multi-component force and moment sensor of claim 13, wherein the first surface is substantially perpendicular to the second surface.

15. The multi-component force and moment sensor of claim 11, wherein an included angle between each sidewall and the reference plane which the arms positioned therein is 45 degrees.

16. The multi-component force and moment sensor of claim 11, wherein the cross beam further comprises a main body, the arms are coupled to the main body and evenly spaced from each other.

17. The multi-component force and moment sensor of claim 16, wherein both the upper cover and the lower cover define a through hole, the main body defines a center hole, the center hole is aligned with the through hole of the upper cover and the through hole of the lower cover.

18. The multi-component force and moment sensor of claim 11, wherein both the upper cover and the lower cover define at least one mounting hole and at least one fixing hole, the at least one mounting hole of the upper cover is aligned with the at least one mounting hole of the lower cover, the at least one fixing hole of the upper cover is aligned with the at least one fixing hole of the lower cover.

19. The multi-component force and moment sensor of claim 11, wherein the mounting assembly further comprises a receiving member coupled to a periphery of the lower cover, the receiving member comprises a receiving portion and a cover coupled to the receiving portion, the receiving portion defines a receiving room, the cover covers the receiving room.

* * * * *